(12) United States Patent
Olsen et al.

(10) Patent No.: US 7,343,395 B2
(45) Date of Patent: Mar. 11, 2008

(54) FACILITATING RESOURCE ACCESS USING PRIORITIZED MULTICAST RESPONSES TO A DISCOVERY REQUEST

(75) Inventors: Gregory P. Olsen, Lindon, UT (US); David A. Eatough, Herriman, UT (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 10/112,103

(22) Filed: Mar. 29, 2002

(65) Prior Publication Data

US 2003/0187931 A1    Oct. 2, 2003

(51) Int. Cl.
G06F 15/167    (2006.01)
G06F 15/16    (2006.01)

(52) U.S. Cl. .................. 709/216; 709/217; 709/219; 709/229; 709/246

(58) Field of Classification Search ............... 709/205, 709/201, 202, 203, 217, 246, 216, 219, 229; 370/546; 710/1
See application file for complete search history.

(56) References Cited

U.S. PATENT DOCUMENTS

| | | | | |
|---|---|---|---|---|
| 5,581,782 A * | 12/1996 | Sarangdhar et al. | ........ | 710/119 |
| 5,790,789 A * | 8/1998 | Suarez | ........ | 709/202 |
| 5,796,977 A * | 8/1998 | Sarangdhar et al. | ........ | 718/1 |
| 5,923,857 A * | 7/1999 | Pawlowski et al. | ........ | 710/107 |
| 5,999,525 A * | 12/1999 | Krishnaswamy et al. | ... | 370/352 |
| 6,006,260 A * | 12/1999 | Barrick et al. | ........ | 709/224 |
| 6,047,343 A * | 4/2000 | Olarig | ........ | 710/302 |
| 6,061,599 A * | 5/2000 | Rhodehamel et al. | ........ | 700/2 |
| 6,085,222 A * | 7/2000 | Fujino et al. | ........ | 709/202 |
| 6,098,132 A * | 8/2000 | Olarig et al. | ........ | 710/302 |
| 6,108,735 A * | 8/2000 | Pawlowski | ........ | 710/107 |
| 6,119,101 A * | 9/2000 | Peckover | ........ | 705/26 |
| 6,119,118 A * | 9/2000 | Kain et al. | ........ | 707/10 |
| 6,192,365 B1 * | 2/2001 | Draper et al. | ........ | 707/101 |
| 6,598,140 B1 * | 7/2003 | McAllister et al. | ........ | 711/168 |
| 6,633,938 B1 * | 10/2003 | Rowlands et al. | ........ | 710/240 |
| 6,745,297 B2 * | 6/2004 | Kruckemyer et al. | ........ | 711/145 |
| 6,848,003 B1 * | 1/2005 | Arimilli et al. | ........ | 709/232 |
| 6,865,633 B2 * | 3/2005 | Rowlands et al. | ........ | 710/240 |
| 6,871,212 B2 * | 3/2005 | Khouri et al. | ........ | 709/204 |
| 6,909,708 B1 * | 6/2005 | Krishnaswamy et al. | ... | 370/352 |
| 6,909,724 B1 * | 6/2005 | Albert et al. | ........ | 370/465 |
| 6,920,584 B2 * | 7/2005 | Phelps et al. | ........ | 714/32 |
| 2001/0010061 A1 * | 7/2001 | Matsumoto | ........ | 709/249 |
| 2001/0021948 A1 * | 9/2001 | Khouri et al. | ........ | 709/218 |
| 2002/0064149 A1 * | 5/2002 | Elliot et al. | ........ | 370/352 |
| 2002/0087613 A1 * | 7/2002 | Harif | ........ | 709/104 |
| 2002/0107807 A1 * | 8/2002 | Ketonen et al. | ........ | 705/51 |
| 2002/0112048 A1 * | 8/2002 | Gruyer et al. | ........ | 709/224 |
| 2002/0147889 A1 * | 10/2002 | Kruchemyer et al. | ........ | 711/144 |

(Continued)

OTHER PUBLICATIONS

Touch et al., LSAM proxy cache: a multicast distributed virtual cache, Jun. 15-17, 1998, Elsevier Science B.V., Computer Networks and ISDN Systems 30 (1998) 2245-2252, 3W3 Cache Workshop, University of Manchester, 2246 and 2250.*

*Primary Examiner*—William Vaughn
*Assistant Examiner*—Peling A Shaw
(74) *Attorney, Agent, or Firm*—Buckley, Maschoff & Talwalkar LLC

(57) ABSTRACT

Systems and methods are provided to facilitate resource access using prioritized multicast responses to a discovery request.

21 Claims, 13 Drawing Sheets

U.S. PATENT DOCUMENTS

| | | | |
|---|---|---|---|
| 2002/0156932 A1* | 10/2002 | Schneiderman | 709/317 |
| 2002/0198984 A1* | 12/2002 | Goldstein et al. | 709/224 |
| 2003/0018705 A1* | 1/2003 | Chen et al. | 709/202 |
| 2003/0018830 A1* | 1/2003 | Chen et al. | 709/328 |
| 2003/0041094 A1* | 2/2003 | Lara et al. | 709/201 |
| 2003/0046405 A1* | 3/2003 | O'Neill et al. | 709/228 |
| 2003/0065986 A1* | 4/2003 | Fraenkel et al. | 714/47 |
| 2003/0069937 A1* | 4/2003 | Khouri et al. | 709/206 |
| 2003/0088808 A1* | 5/2003 | Phelps et al. | 714/25 |
| 2003/0126136 A1* | 7/2003 | Omoigui | 707/10 |
| 2003/0126383 A1* | 7/2003 | Cho et al. | 711/154 |
| 2003/0145038 A1* | 7/2003 | Bin Tariq et al. | 709/202 |
| 2004/0049620 A1* | 3/2004 | Rowlands et al. | 710/107 |
| 2004/0083305 A1* | 4/2004 | Wang et al. | 709/240 |
| 2004/0133640 A1* | 7/2004 | Yeager et al. | 709/204 |
| 2004/0172339 A1* | 9/2004 | Snelgrove et al. | 705/26 |
| 2004/0199765 A1* | 10/2004 | Kohane et al. | 713/165 |
| 2004/0225845 A1* | 11/2004 | Kruckemyer et al. | 711/146 |
| 2005/0038943 A1* | 2/2005 | Cho et al. | 710/100 |

* cited by examiner

800 →

| RESPONSE IDENTIFIER 802 | RESPONSE AGENT IDENTIFIER 804 | REQUEST AGENT IDENTIFIER 806 | RESOURCE IDENTIFIER 808 | PRIORITY VALUE 810 |
|---|---|---|---|---|
| R1001 | AGENT 102 | AGENT 103 | FILE 101 | 2 |
| R1002 | AGENT 106 | AGENT 103 | FILE 101 | 4 |
| R1003 | AGENT 104 | AGENT 107 | FILE 103 | N/A |
| R1004 | AGENT 106 | AGENT 109 | FILE 102 | LOW |

FIG. 8

FACILITATING RESOURCE ACCESS USING PRIORITIZED MULTICAST RESPONSES TO A DISCOVERY REQUEST

BACKGROUND

A device in a network often needs to access a resource associated with another device in the network. Consider, for example, a Local Area Network (LAN) that includes a number of Personal Computers (PCs). Moreover, a first PC in the network needs to access a file that it does not currently have (e.g., a file that is not stored locally at the first PC). In this case, the PC may locate a second PC in the network that does have the file. The first PC can then ask the second PC to transmit the file to the first PC via the network.

To locate the second PC, the first PC can transmit a discovery request, including the file's name, to the other PCs in the network. Every PC in the network that has the file can then transmit a response to the first PC.

Such an approach, however, can have a number of disadvantages. For example, the first PC may receive a large number of responses to the discovery request. These responses can consume bandwidth in the network and take a considerable amount of time to process, especially in a large network (e.g., a network having a thousand PCs).

Similarly, a large number of discovery requests may be transmitted in the network. For example, hundreds of PCs may need to access a file that contains an updated virus definition list. All of these discovery requests, and associated responses, will also use bandwidth and processing time.

Moreover, more than one PC in the network may have the file. Each of those PCs, however, may not be equally suitable to transmit the file to the first PC. For example, one PC might have a fast processor that is not currently being used, while another PC has a slower processor that is being heavily used. Similarly, different PCs might have different maximum speeds at which information can be transmitted. In either case, the file may be accessed inefficiently.

BRIEF DESCRIPTION OF THE DRAWINGS

FIG. 8 is a tabular representation of a portion of a response cache according to one embodiment.

DETAILED DESCRIPTION

Figure 1:
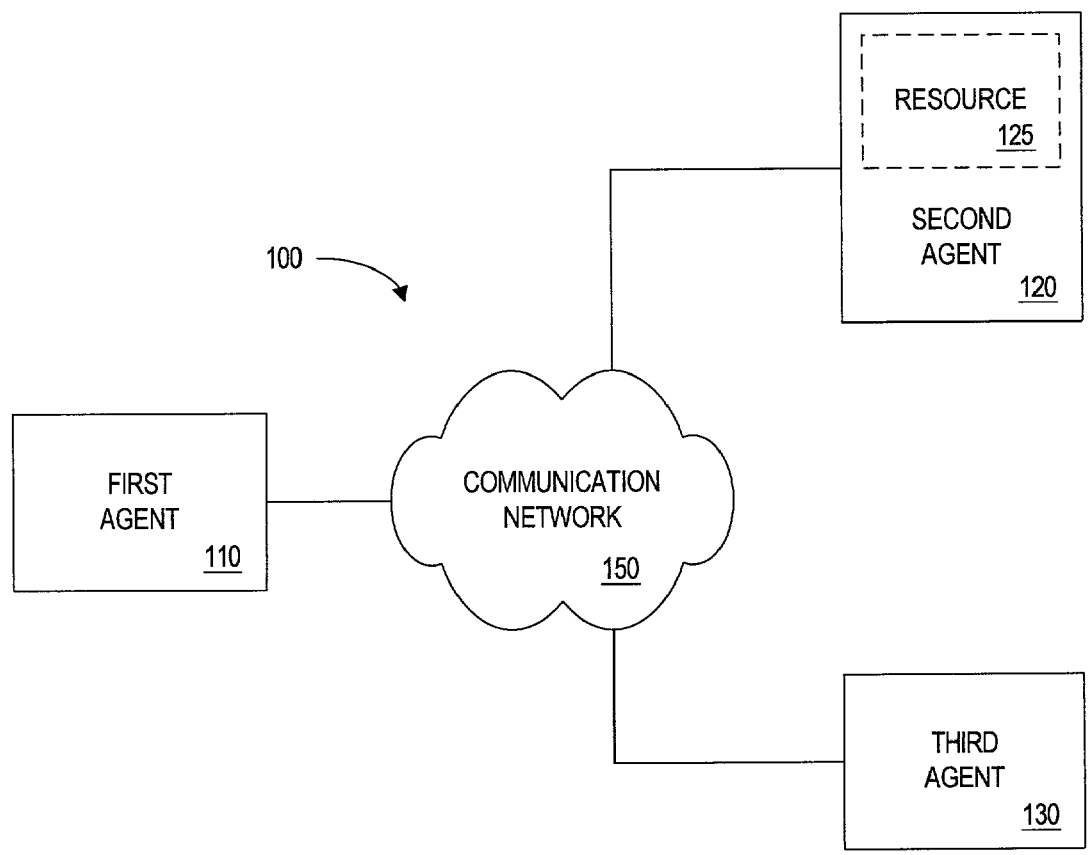
FIG. 1 is a block diagram of a system according to some embodiments.

Turning now in detail to the drawings, FIG. 1 is a block diagram of a system 100 according to some embodiments. In particular, three agents 110, 120, 130 communicate with each other via a communication network 150.

The communication network 150 may be associated with, for example, a LAN, a Virtual LAN (VLAN), a Metropolitan Area Network (MAN), a Wide Area Network (WAN), a Fast Ethernet network, a wireless network, a fiber network, a peer-to-peer network, a packet network, and/or an Internet Protocol (IP) network, such as an intranet or an extranet. Note that the communication network 150 may include a number of different networks.

The agents 110, 120, 130 may comprise, for example, network devices such as PCs, servers (e.g., file servers or Web server), and/or portable computers such as laptop computers or Personal Digital Assistants (PDAs). Note that any number of agents, including different types of agents, may be associated with the system 100. Also note that, as used herein, the term "agent" may refer to any type of entity—including a software application or a hardware device.

According to some embodiments, an agent may store or otherwise be associated with a "resource." For example, the second agent 120 illustrated in FIG. 1 locally stores a resource 125. A resource may comprise, for example, a file containing executable information (e.g., a software program). The file may also contain other data, such as an update to information, text information, audio information, and/or image information (e.g., photographic or video information).

An agent may want to access (e.g., transmit or receive) a resource through the communication network 150. For example, the first agent 110 may want to access resource 125. In this case, the second agent 120 may transmit the resource 125 to the first agent 110. Several methods associated with resource access will now be described with respect to FIGS. 2 through 6.

Response Cache Methods

Figure 2:
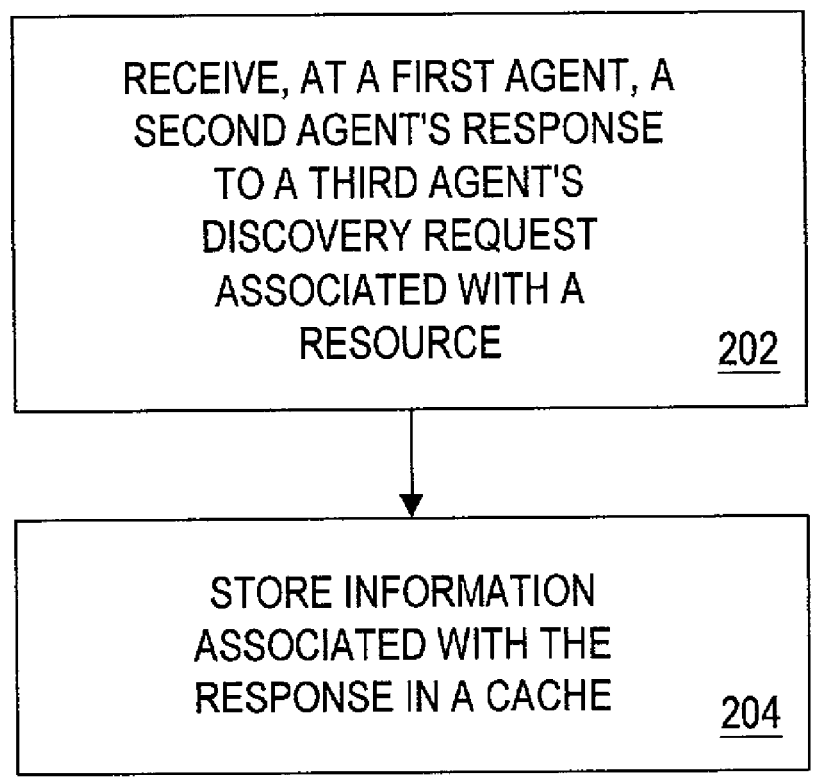
FIG. 2 is a flow chart of a method for updating a response cache according to some embodiments.

FIG. 2 is a flow chart of a method for updating a response cache according to some embodiments. The method may be performed, for example, by the first agent 110 illustrated in FIG. 1. The flow charts in FIG. 2 and the other figures described herein do not imply a fixed order to the steps, and embodiments can be practiced in any order that is practicable.

At 202, the first agent 110 receives a response that the second agent 120 is providing to a discovery request that had previously been transmitted by the third agent 130.

For example, the third agent 130 may initially multicast (e.g., to the first agent 110 and the second agent 110) a discovery request asking each agent to respond if it has access to the resource 125. The discovery request may include, for example, an agent identifier or device address associated with the third agent 130. The discovery request may also include a resource identifier, such as a file name. A resource may also be identified by other information, such as a file path, a file size, a file date (e.g., the date on which the file was last updated), a Cyclic Redundancy Checking (CRC) value, and/or a hash value. The discovery request may also include a remote location identifier, such as a Uniform Resource Locator (URL) address or a Universal Naming Convention (UNC) path.

In this case, the second agent 120 may multicast (e.g., to the first agent 110 and the third agent 130) a response indicating that it does have access to the resource 125 (e.g., the resource is locally stored at the second agent 120). The response may include any of the information described with respect to the discovery request (e.g., a file name). The response may also include an agent identifier associated with the second agent 120. As described with respect to FIG. 6, the response may also include a priority value according to some embodiments.

The discovery request issued by the third agent 130 might indicates that the third agent 130 is attempting to receive some or all of the resource 125. For example, the third agent 130 may be attempting to receive an updated virus definition list. In this case, the response provided by the second agent 120 would indicate that the second agent 120 is able to provide at least a portion of the resource 215.

According to other embodiments, the discovery request issued by the third agent 130 indicates that the third agent 130 is attempting to provide some or all of the resource 125. For example, the third agent 130 may be attempting to install a software application on other agents in the network. In this case, the response provided by the second agent 120 would indicate that the second agent 120 wants (or needs) to receive at least a portion of the resource 125.

At 204, the first agent 110 stores information associated with the response in a cache. For example, the first agent 110 may locally store the file identifier and the agent identifier associated with the second agent 120 in a response cache. Note that the first agent 110 is storing this information even though it neither generated the discovery request nor responded to the discovery request. Also note that the second agent 120 may subsequently transmit the resource 125 to the third agent 130 without involving the first agent 110.

The response cache may include information associated with a number of different responses. Moreover, the response cache may include information associated with a number of different discovery requests.

In addition to storing information in the response cache, the first agent 110 may remove information from the response cache. For example, the first agent 110 may delete information associated with a particular resource when another response associated with that resource is received (e.g., a new response may replace an older response or a response with a low priority value may replace one with a higher priority value). Information may be removed from the response cache, for example, at a pre-determined time (e.g., at the end of the day) or after a pre-determined period of time (e.g., information about a response may be deleted after thirty days). Information may also be removed on a period basis (e.g., every week).

Figure 3:
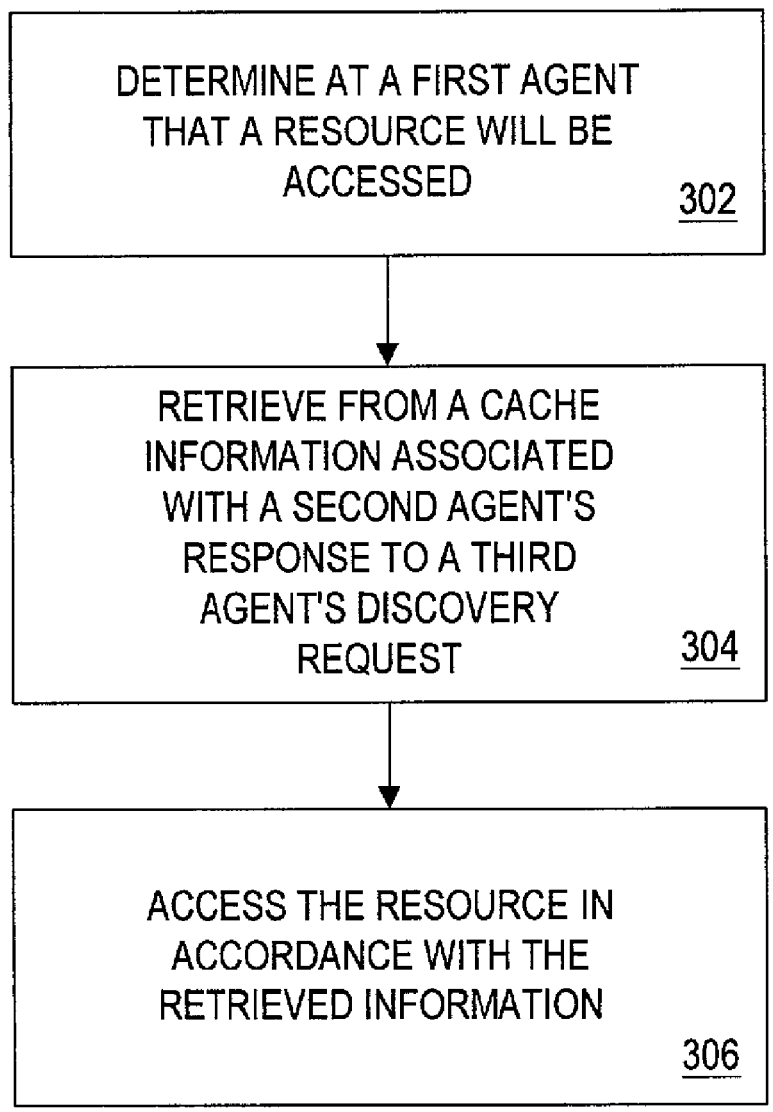
FIG. 3 is a flow chart of a method for using a response cache according to some embodiments.

As will now be explained, the first agent 110 may use the information in the response cache to facilitate access to resources (e.g., resource 125) via the communication network 150. In particular, FIG. 3 is a flow chart of a method for using the response cache according to some embodiments.

At 302, the first agent 110 determines that the resource 125 will be accessed. For example, a software application executing at the first agent 110 may determine that the resource 125 needs to be downloaded from (or uploaded to) one or more other agents.

At 304, the first agent 110 retrieves information from the response cache. In particular, the first agent 110 reviews information in the response cache to determine if any of the stored responses were associated with the resource 125 to be accessed. If none of the stored responses are associated with the resource 125, the first agent 110 can simply issue a discovery request to determine where the resource 125 may be obtained.

In the present example, however, the first agent 110 retrieves from the response cache the information associated with the response that was transmitted by the second agent 120 (e.g., in response to the discovery request that was previously transmitted by the third agent 130).

At 306, the first agent 110 accesses the resource 125 in accordance with the retrieved information. That is, the first agent 110 may realize that it can ask the second agent 120 for the resource 125 (e.g., because the first agent 110 previously observed the second agent 120 indicate that the resource 125 was available to the third agent 130). In this way, the first agent 110 can save the bandwidth and processing time that would have otherwise been used by issuing a discovery request (and receiving the associated responses).

According to some embodiments, the first agent 110 asks the third agent 130 for the resource 130 (e.g., the first agent 110 may assume that the third agent 130 eventually received the resource 125 from the second agent 120). For example, the first agent 110 may turn to the third agent 130 when the second agent 120 unavailable (e.g., is not communicating).

Discovery Request Methods

Figure 4:
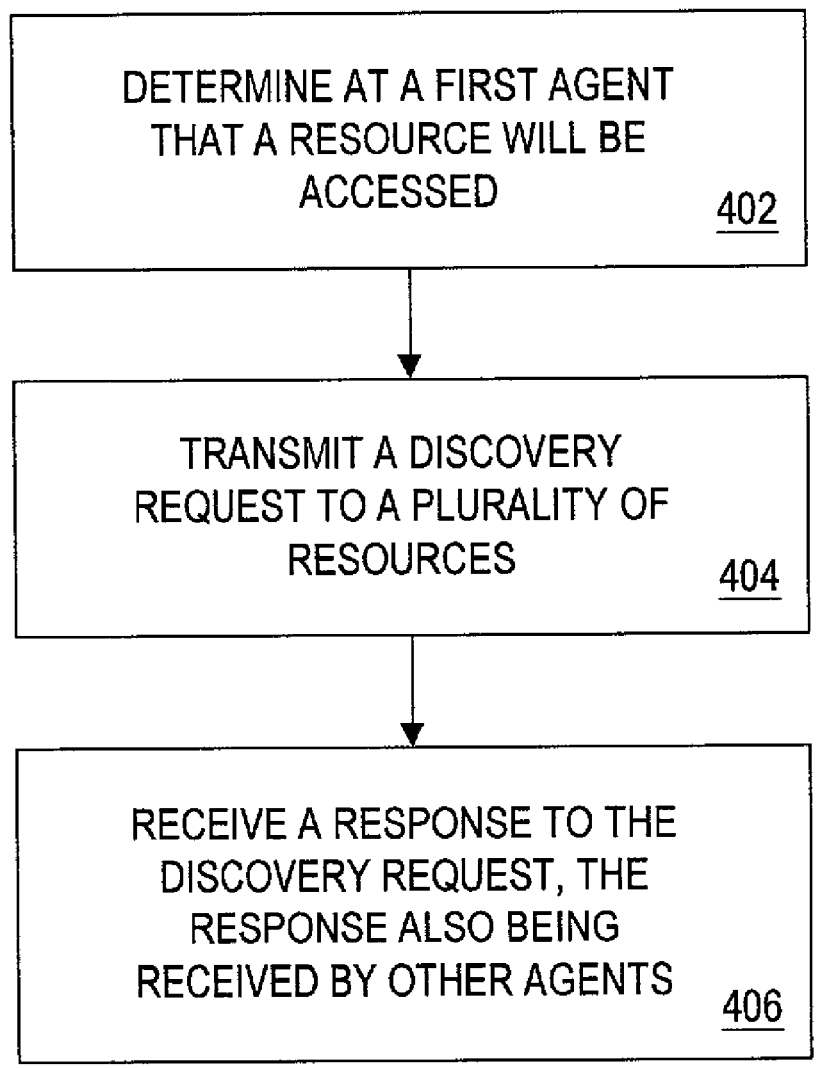
FIG. 4 is a flow chart of a discovery request method according to some embodiments.

FIG. 4 is a flow chart of a discovery request method according to some embodiments. The method may be performed, for example, by the first agent 110 illustrated in FIG. 1.

At 402, the first agent 110 determines that the resource 125 will be accessed. For example, a software application executing at the first agent 110 may want to download the resource 125. As described with respect to FIG. 3, the first agent 110 may retrieve information from a response cache to see if any of the stored responses are associated with this resource 125. In this example, however, assume either that (i) this process is not performed or (ii) this process is performed, but none of the stored responses are associated with the resource 125.

The first agent 110 then transmits a discovery request to a plurality of agents at 404 (e.g., to the second agent 120 and the third agent 130). As previously described, such a discovery request might include a file name associated with the resource 125 and an agent identifier associated with the first agent 110.

At 406, the first agent 110 receives a response to the discovery request, the response also being received by at least one other agent (e.g., the second agent 120 may transmit a multicast response to both the first agent 110 and the third agent 130). In this way, other agents can use the information included in the response (e.g., and perhaps avoid having to issue subsequent discovery requests).

The first agent 110 can then access the resource 125 in accordance with the response. For example, the first agent 110 may receive some or all of the resource 125 from (or provide some or all of the resource 125 to) the second agent 120.

According to some embodiments, the first agent 110 may receive a number of different responses (i. e., from different agents). For example, the first agent 110 may receive responses from both the second agent 120 and the third agent 130. In this case, the first agent 110 may simply select an agent that will be used to access the resource 125 (e.g., the agent that responds first might be selected). According to some embodiments, the first agent 110 use a predetermined rule to select an agent (e.g., based on an agent identifier and a locally stored table of high performance agents).

Figure 6:
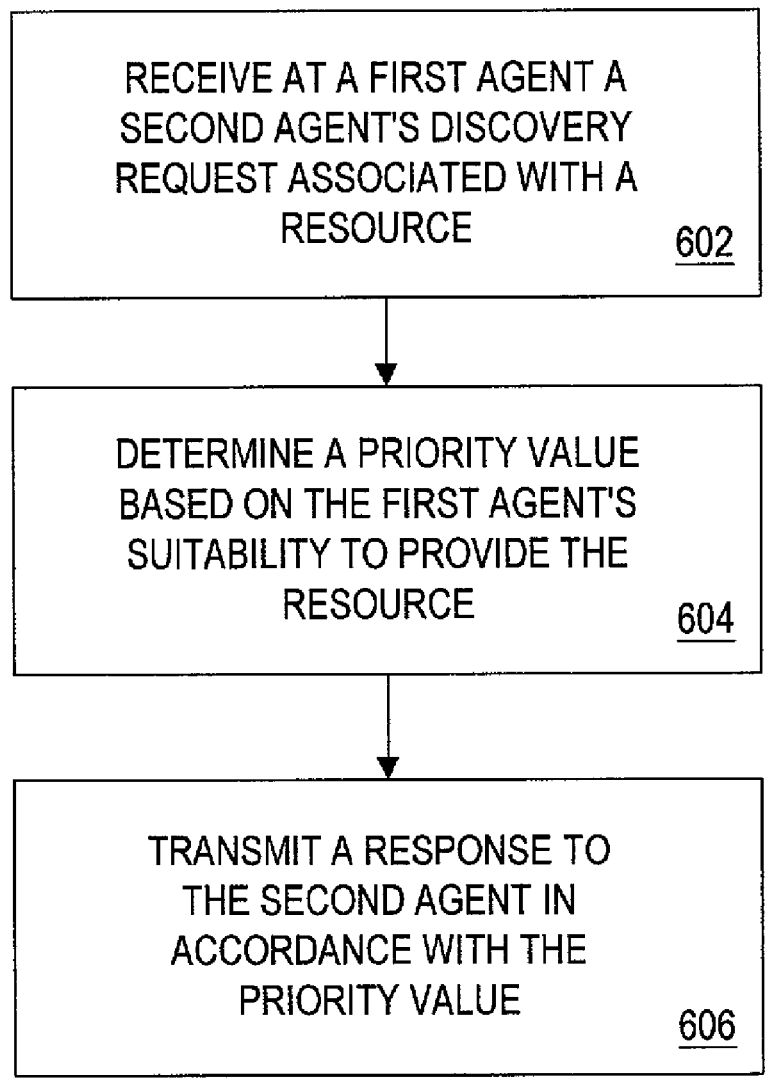
FIG. 6 is a flow chart of a prioritization method according to some embodiments.

As described with respect to FIG. 6, some or all of the responses may include a priority value. In this case, the first agent 110 can select an agent based on the priority values (e.g., the agent that reports the highest priority value might be selected).

Discovery Response Methods

Figure 5:
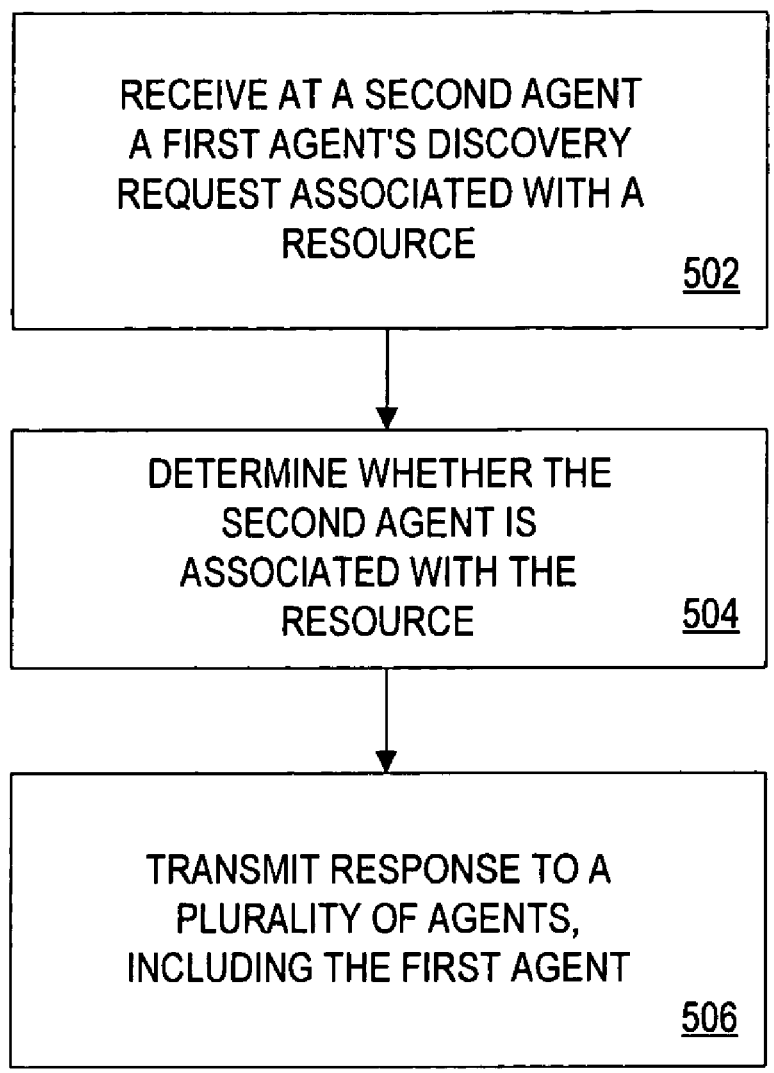
FIG. 5 is a flow chart of a discovery response method according to some embodiments.

FIG. 5 is a flow chart of a discovery response method according to some embodiments. The method may be performed, for example, by the second agent 120 illustrated in FIG. 1.

At 502, the second agent 120 receives from the first agent 110 a discovery request associated with the resource 125. The discovery request may include, for example, a file name associated with the resource 125. Note that the discovery request might, according to some embodiments, indicate that the first agent 110 is interested in receiving some or all of the resource 125. According to other embodiments, the discovery request instead indicates that the first agent 110 is interested in providing some or all of the resource 125 (e.g., to agents that do not have a complete copy of the resource 125).

At 504, the second agent 120 determines whether or not it is associated with the resource 125. For example, the second agent 120 may search a local storage device looking for the file name. If the second agent 120 did not find the file name, no further action might be taken. Note that the second agent 120 might still wait for other agents to respond to the discovery request (e.g., to update a locally stored response cache). According to some embodiments, the second agent 120 might provide a "negative" response to the discovery request (e.g., indicating that it does not have access to the resource 125).

In the present example, however, assume that the second agent 120 does find the file name. As a result, the second agent 120 transmits a response at 506 to a plurality of agents, including the agent that issued the discovery request (i.e., the first agent 110). For example, the second agent might transmit a multicast response to the other agents.

The second agent 120 may also provide the resource 125 to the first agent 110 (e.g., after the first agent 110 decides to access the resource 125 via the second agent 120).

Prioritization Methods

FIG. 6 is a flow chart of a prioritization method according to some embodiments. The method may be performed, for example, by the second agent 120 illustrated in FIG. 1.

At 602, the second agent 120 receives from the first agent 110 a discovery request associated with the resource 125. The discovery request may include, for example, a file identifier associated with the resource 125. The discovery request might indicate that the first agent 110 is interested in receiving (or providing) some or all of the resource 125.

The second agent 120 may then search a local storage device looking for the file identifier. If the second agent 120 did not find the file identifier, no further action might be taken. In the present example, however, assume that the second agent 120 does find the file identifier.

According to this embodiment, the second agent 120 then determines at 604 a priority value based on its suitability to provide the resource 125 to the first agent 110. The priority value may be, for example, numerical value (e.g., from 1 through 10), a category (e.g., "high" or "low"), or a date (e.g., indicating the last time the resource 125 was updated).

The priority value may be based on, for example, the second agent's ability to exchange information. For example, if the second agent 120 has a fast processor that is not currently being used, the priority value might be "high." On the other hand, if the second agent 120 has a slower processor that is currently being used, the priority value might be "low." The priority value might also be based on a connection capability (e.g., associated with a maximum speed at which the second agent 120 can transmit information to other agents).

The priority value might also be associated with a resource amount. For example, the priority value might be based on how much (and/or which parts) of the resource 125 the second agent 120 can provide (or needs to receive).

Note that the determination made at 604 might be dynamically performed in response to a discovery request. According to another embodiment, the determination instead comprises retrieving a pre-stored value (e.g., a network administrator might manually assign a priority value to the second agent 120).

At 606, the second agent 120 transmits a response to the first agent 110 in accordance with the priority value. For example, the second agent 120 might transmit a multicast response (e.g., to the first agent 110 and the third agent 130) that includes the priority value.

According to some embodiments, the second agent 120 calculates a delay period for the response. That is, the second agent 120 might not immediately transmit the response but instead waits an amount of time (i.e., the delay period) before transmitting the information. The delay period may be calculated, for example, based on a predetermined value and/or a random process (e.g., to prevent all agents from flooding the network with responses at the same time).

According to some embodiments, the delay period is based (i.e., based at least in part) on the priority value. For example, a high priority value (i.e., indicating that the agent is especially suitable to provide the resource 125) might result in a short delay period. As a result, agents who are especially suitable to provide the resource 125 will be the first to respond to a discovery request. Moreover, an agent can monitor the priority values included in other agent's responses to a discovery request. That is, the second agent 120 might decide that it doesn't need to respond at all (even though it can provide the resource 125) if it sees that the third agent 130 has already responded. According to some embodiments, the second agent 120 might still respond (e.g., if the second agent 120 determines that it would be a more suitable source for the resource 125 based on priority values). In this way, the most suitable agents may be quickly determined—and the number of responses transmitted in the system 100 may be reduced The second agent 120 may also transmit the resource 125 to the first agent 110 (e.g., if the first agent 110 decides to access the resource 125 via the second agent 120 based on priority values).

Agent

Figure 7:
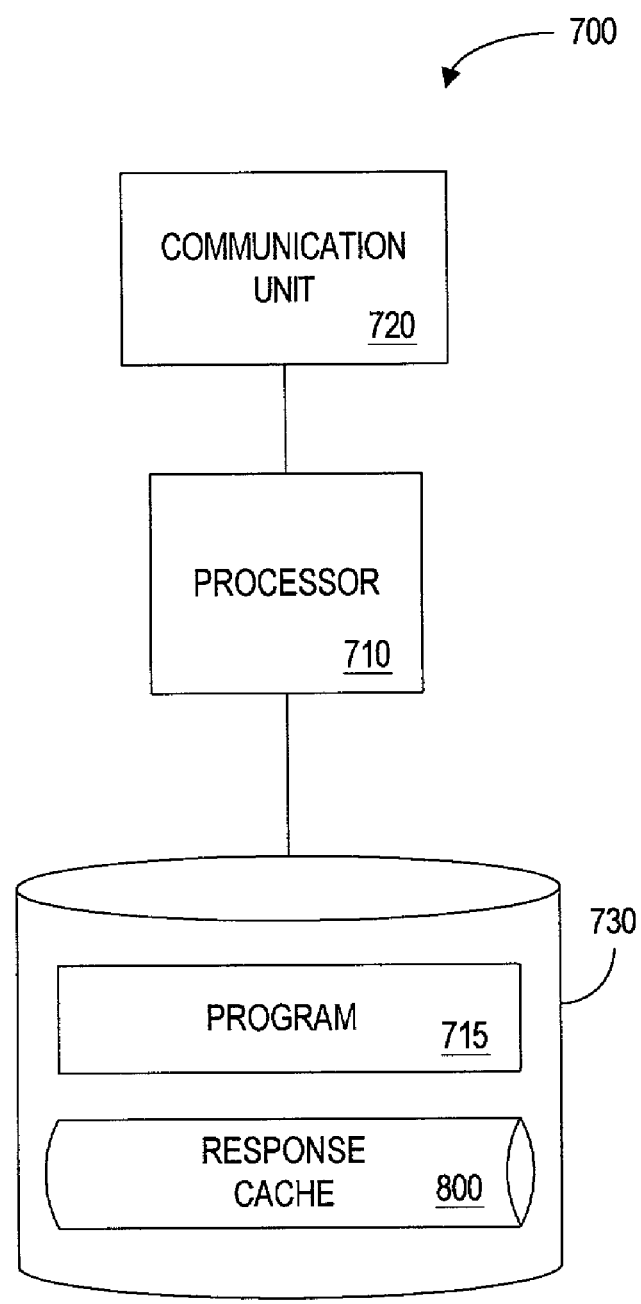
FIG. 7 is a block diagram of an agent according to one embodiment.

FIG. 7 illustrates an agent 700 that may be descriptive of any of the agents shown, for example, in FIG. 1 according to some embodiments. The agent 700 includes a processor 710, such as one or more INTEL® PENTIUM® processors. The processor 710 is coupled to a communication unit 720 which may be adapted to communicate with, for example, other agents in a network.

The processor 710 is also in communication with a storage device 730. The storage device 730 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715. For example, the processor 710 may receive another agent's response to (yet) another agent's discovery request associated with a resource. The processor 710 may then store information associated with the response in a cache.

According to another embodiment, the processor 710 determines that a resource will be accessed. The processor 710 then retrieves information associated with another agent's response to (yet) another agent's discovery request and accesses the resource in accordance with the retrieved information.

According to another embodiment, the processor 710 determines that a resource will be accessed and transmits a discovery request to a plurality of agents. The processor 710 then receives a response to the discovery request (and the response is also received by another agent).

According to another embodiment, the processor 710 receives another agent's discovery request associated with a resource and determines whether it is associated with the resource (e.g., by determining if the resource is locally stored in the storage device 730). The processor 710 then transmits a response to a plurality of agents.

According to still another embodiment, the processor 710 receives another agent's discovery request associated with a resource. The processor 710 then determines a priority value based on its suitability to provide the resource and transmits a response to the other agent in accordance with the priority value.

As used herein, information may be "received" by or "transmitted" to a software application or module within the agent 700 from: (i) another agent, (ii) another software application or module within the agent 700, or (iii) any other source.

As shown in FIG. 7, the storage device 730 also stores a response cache 800. An example of a response cache 800 that may be used in connection with the agent 700 will now be described in detail with respect to FIG. 8. The illustration and accompanying description of the response cache 800 is exemplary, and any number of other arrangements could be employed.

Response Cache

Referring to FIG. 8, a table represents the response cache 800 that may be stored at the agent 700 according to one embodiment. The table includes entries associated with responses to discovery requests, including discovery requests transmitted by other agents. The table also defines fields 802, 804, 806, 808, 810 for each of the entries. The fields specify: a response identifier 802, a response agent identifier 804, a request agent identifier 806, a resource identifier 808, and a priority value 810. The information in the response cache 800 may be created and updated, for example, based on information received from other agents (e.g., multicast responses to discovery requests).

The response identifier 802 may be, for example, an alphanumeric code associated with a response to a discovery request. According to another embodiment, no response identifier 802 is stored in the response cache 800 (i.e., the location of information in the response cache 800 may be sufficient to identify information associated with a response).

The response agent identifier 804 indicates the agent that provided the response and the request agent identifier 806 indicates the agent that had previously issued the associated discovery request. The resource identifier 808 indicates the resource associated with the discovery request (and the response). The resource identifier 808 may be, for example, a file name. The priority value 810 indicates the suitability of the agent associated with the response agent identifier 804 to provide the resource. The priority value 810 may be, for example, numerical value, a category, or a date.

Note that the first two entries in FIG. 8 are associated with different responses (i.e., from different agents) to the same discovery request. If access to "FILE 101" is required, the agent can review the information in the response cache 800 and decide to access the resource via "AGENT 106" (because the response from "AGENT 106" had a higher priority value 810 as compared to the response from "AGENT 102"). Similarly, if access to "FILE 105" is required, the agent can review the information response cache 800 and decide that a discovery request needs to be issued (because no response associated with that resource was found).

Other information may also be stored in the response cache 800. For example, the response cache 800 may indicate a date and time associated with each response (e.g., so that information can be removed after seven days).

EXAMPLE

Figure 9:
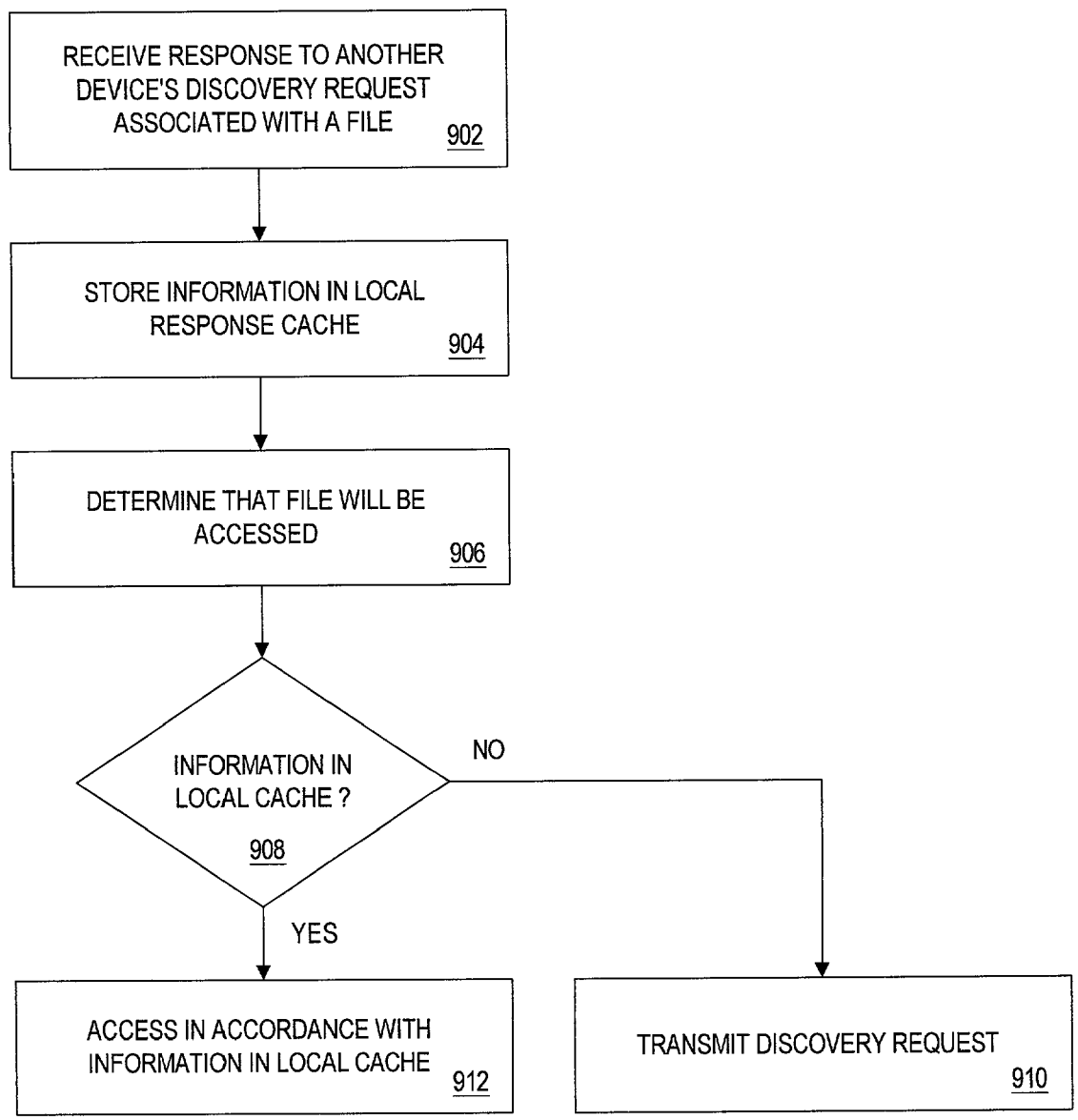
FIG. 9 is a flow chart of a computer-implemented method according to some embodiments.

FIG. 9 is a flow chart of a computer-implemented method of facilitating access to files according to some embodiments. The method may be performed, for example, by a device in a peer-to-peer network.

At 902, a response to another device's discovery request is received. The response includes a device identifier associated with the other device, a file identifier, and a priority value. The response may be, for example, a multicast response.

At 904, information associated with the response is stored in a local response cache that contains information about a number of different responses and a number of different files. For example, the response agent identifier 804 (i.e., the device identifier), the resource identifier 808 (i.e., the file identifier), and the priority value 810 in the response cache 800 can be updated.

The device later determines that it also needs to access the file at 906. If the appropriate information is not located in the local response cache 800, the device transmits a discovery request at 910. That is, if none of the resource identifiers 808 in the response cache 800 match the file identifier, the device will attempt to find the file by issuing a discovery request.

However, if the appropriate information is located in the response cache 800, the device accesses the information in accordance with the information at 912. That is, if a resource identifier 808 in the response cache 800 matches the file identifier, the file can be accessed via the device associated with the response agent identifier 804.

State Transitions

Figure 10:
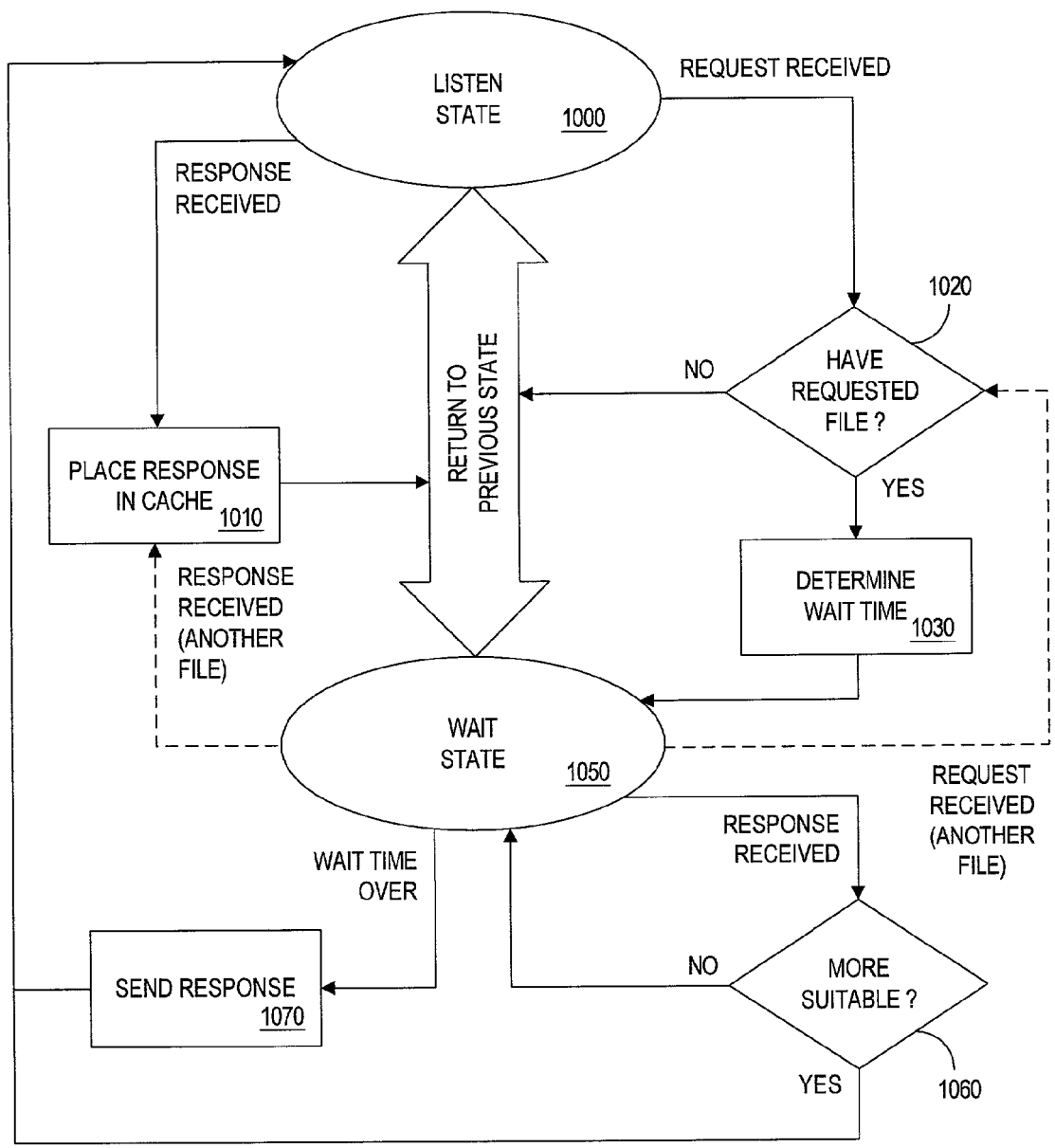
FIG. 10 is a state transition diagram according to some embodiments.

FIG. 10 is a state transition diagram according to some embodiments. In particular, FIG. 10 illustrates how an agent may transition between a listen state 1000 and a wait state 1050.

When in the listen state 1000, the agent may receive a response to another agent's discovery request. In this case, the received response is placed in a cache at 1010, and the agent returns to the listen state 1000.

When a discovery request associated with a file is received, the agent determines at 1020 whether or not it has the requested file. If the agent does not have the requested file, it simply returns to the listen state 1000.

If the agent does have the requested file at 1020, it determines, a wait time at 1030. For example, the wait time 1030 may be determined based on the agent's ability to provide the file and/or a random process.

The agent then enters the wait state 1050. If the agent receives a response from another agent indicating that it also has the requested file, the agent determines if the other agent is a more suitable source for the file at 1060. For example, the agent may examine a priority value included in the other agent's response to determine if the other agent is a better source for the file. If the other agent is a more suitable source at 1060, the agent returns to the listen state 1000 (i.e., the agent will not bother responding to the discovery request). If the other agent was not a more suitable source at 1060, the agent returns to the wait state 1050.

When the wait time is over, the agent sends a response at 1070 and returns to the listen state 1000. That is, no other, more suitable agent has appeared so the agent responds to the discovery request and indicates that it has access to the file (and perhaps includes a value reflecting its own suitability). As indicated by dashed lines in FIG. 10, the agent may also handle responses and requests associated with other files while in the wait state 1050.

Subnet Embodiment

Figure 11:
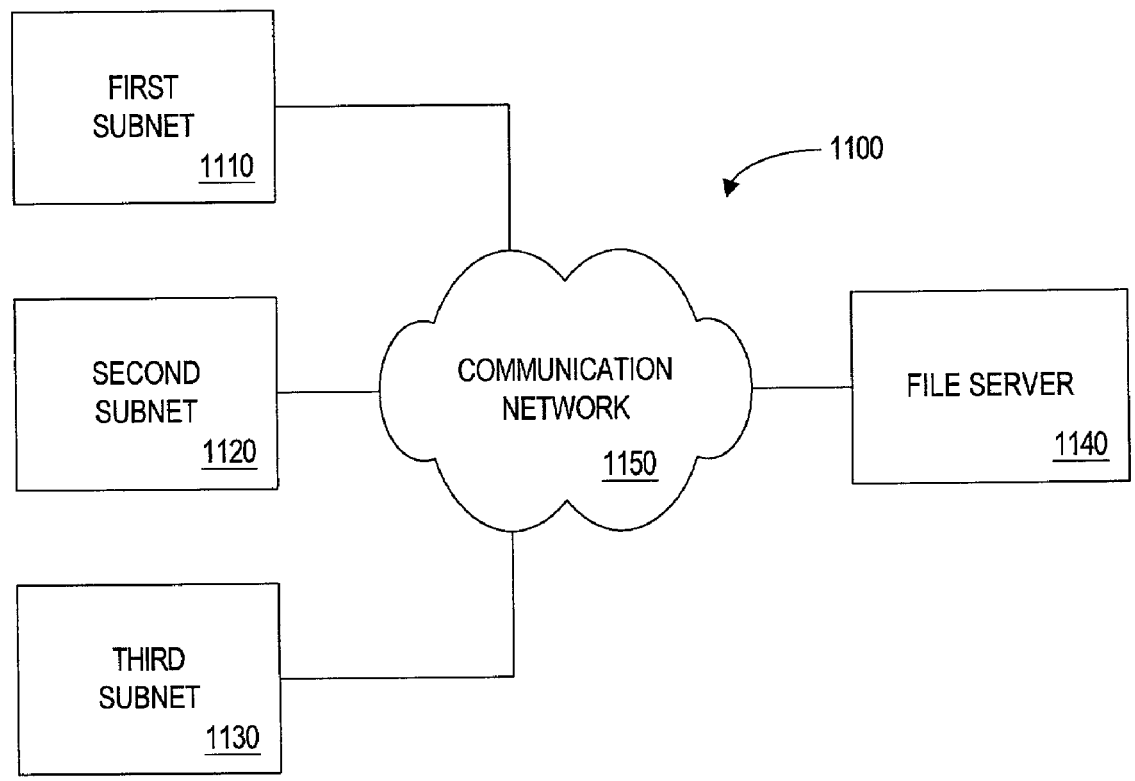
FIG. 11 is a block diagram of a subnet system according to some embodiments.

FIG. 11 is a block diagram of a subnet system 1100 according to some embodiments. In particular, a number of subnets 1110, 1120, 1130 communicate with a file server 1140 through a communication network 1150. The communication network 1150 may comprise, for example, a WAN or the Internet. The file server 1140 may, for example, store a number of files that may be accessed by devices within the subnets 1110, 1120, 1130 (e.g., the files may be transmitted to the devices). The file server 1140 may also comprise a Web server.

Figure 12:
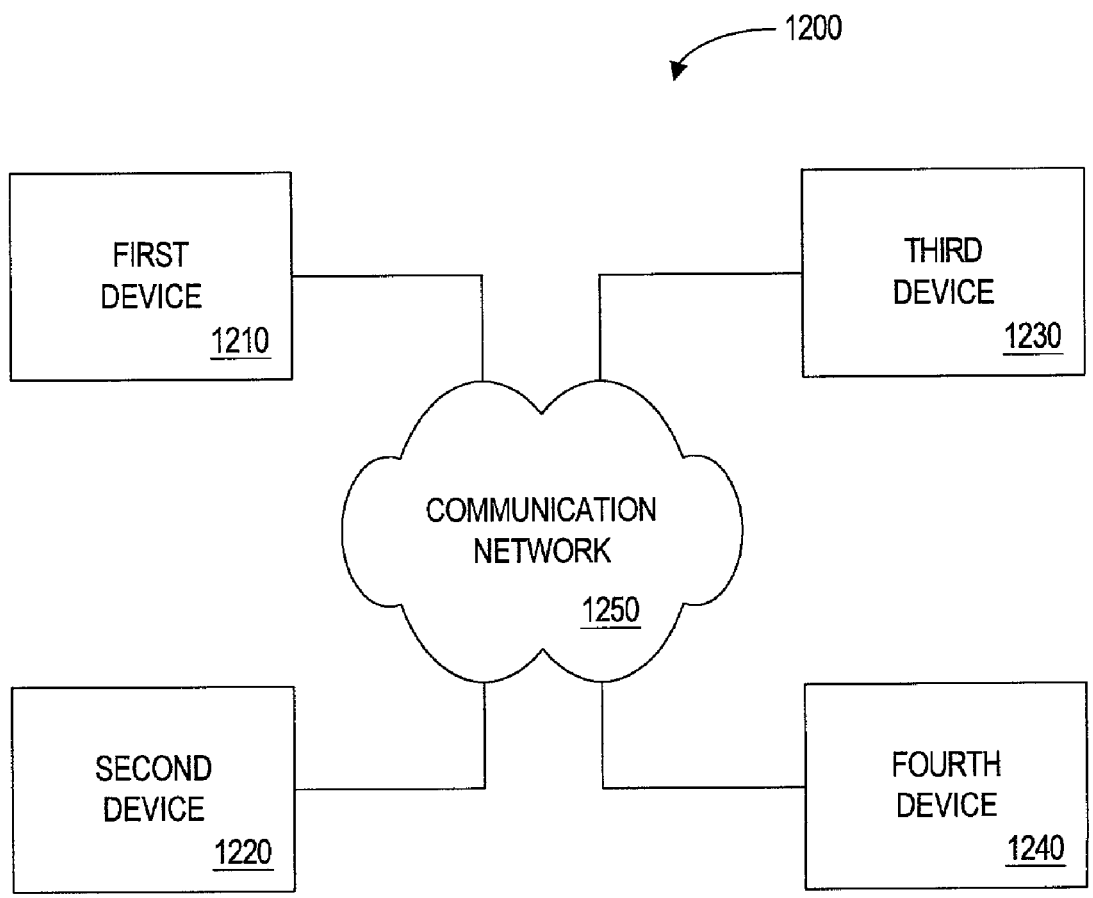
FIG. 12 is a block diagram of a subnet according to some embodiments.

As shown in FIG. 12, a subnet 1200 may include a number of devices 1210, 1220, 1230, 1240 that communicate with each other through another communication network 1250 (such as a LAN). According to this embodiment, one or more of these devices 1210, 1220, 1230, 1240 may act as a subnet "representative." A subnet representative may, for example, receive a file from the file server 1140 (e.g., via a point-to-point protocol) and distribute the file to other devices within the subnet 1200 (e.g., via a multicast protocol).

Figure 13:
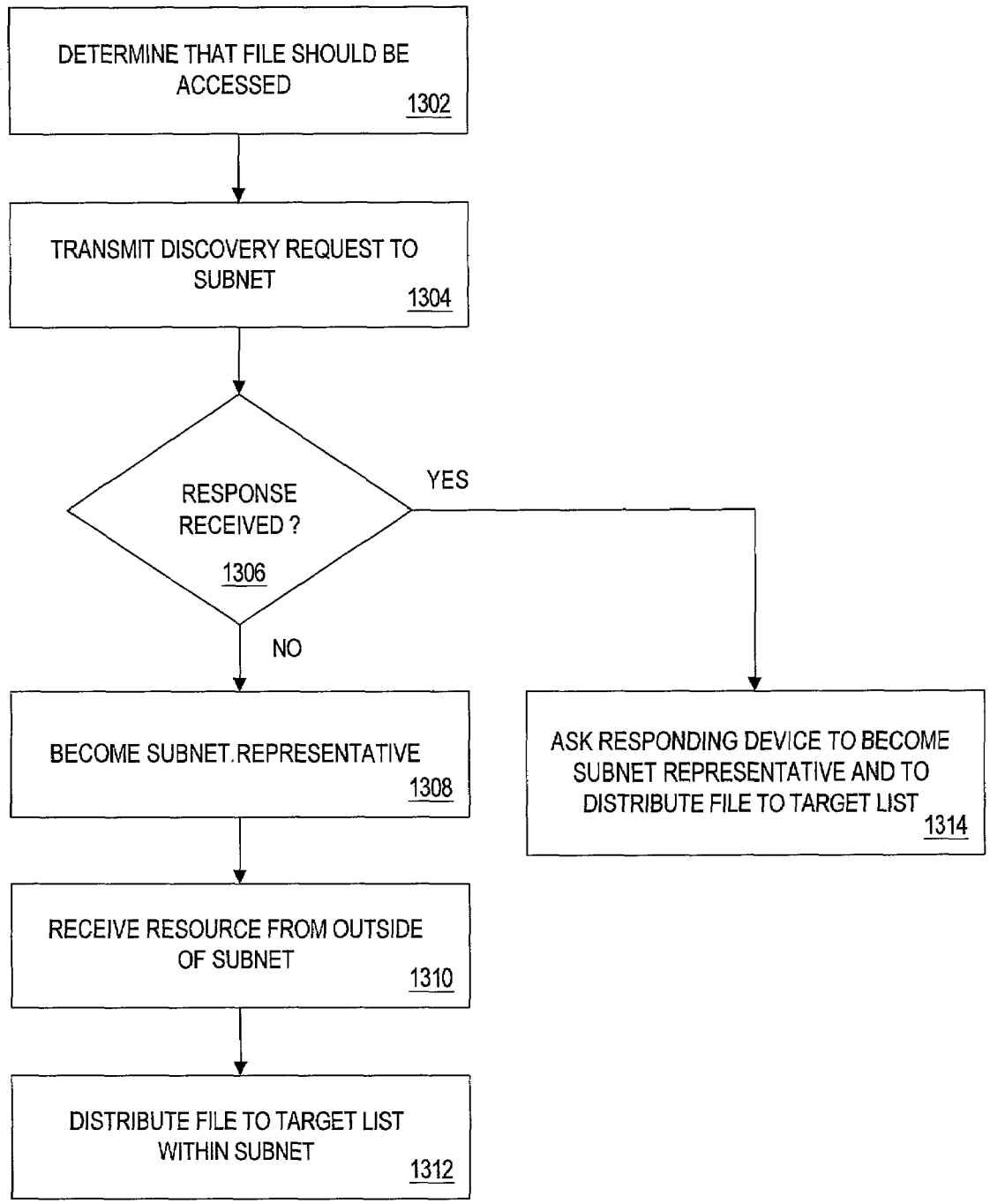
FIG. 13 is a flow chart of a method for facilitating resource access via a subnet according to some embodiments.

FIG. 13 is a flow chart of a method for facilitating resource access via the subnet 1200 according to some embodiments. The method may be performed, for example, by the second device 1220.

At 1302, the second device 1220 determines that a resource, such as a file, should be accessed. Note that one or more other devices in the subnet 1200 may also need to access the file. For example, the file server 1140 or a subnet representative might have attempted to install a file on all of the devices in the subnet system 1100. Some of the devices in the subnet 1200, however, may have been powered off during this process. In this case, those devices may comprise a "target list" of devices that still need to receive some or all of the file.

At 1304, the second device 1220 transmits a multicast discovery request to the other devices within the subnet 1200. Any device that (i) has the file and (ii) is able to serve or act as a subnet representative may then respond to the discovery request.

If no responses to the discovery request are received at 1306, the second device 1220 becomes the subnet representative at 1308 and downloads the file from outside the subnet 1200 (e.g., from the file server 1140) at 1310. At 1312, the second device 1220 distributes the file to the other devices 1210, 1230, 1240 as required (e.g., to all of the devices in the target list via a multicast protocol).

If at least one response to the discovery request is received at 1306, the second device 1220 asks the responding device to serve or act as a subnet representative and to distribute the file (e.g., to all of the devices in the target list via a multicast protocol) at 1314.

Note that the second device 1220 might receive multiple responses to the discovery request. For example, the first device 1210 and the fourth device 1240 might both respond to the discovery request. In this case, the device that responds first might be selected. According to another embodiment, the most suitable device is selected (e.g., based on priority values included in the responses).

As compared to having each device in the subnet 1200 receive the file from the file server 1140, this embodiment may reduce traffic over the communication network 1150 (which, as with a WAN, could be more expensive than the subnet's communication network 1250).

Note that the discovery request and the response process may include any of the features described herein (e.g., a local response cache). Also note that, in addition to subnets, this embodiment may used with respect to any type of domain, including a "multicast" domain comprised of devices from a number of different subnets.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above-described apparatus and methods to accommodate these and other embodiments and applications.

Although some embodiments described herein use a multicast protocol to provide information (e.g., a discovery request or response) to a number of different agents, other protocols may instead be used. For example, a broadcast transmission (or a number of different point-to-point transmissions) may be used to provide information to a number of different agents.

According to another embodiment, a discovery request may include information associated with the priority value described with respect to FIG. 6. For example, the discovery request may include a threshold value below which other agents should not respond (e.g., the agent may already be aware of another agent that can provide a resource at that threshold). Similarly, the discovery request may include parameters that another agent should use when determining its suitability to provide the resource being requested.

The several embodiments described herein are solely for the purpose of illustration. Persons skilled in the art will recognize from this description that other embodiments may be practiced with modifications and alterations limited only by the claims.

What is claimed is:

1. A method of facilitating access to resources through a network, comprising:

receiving, at a first agent, a second agent's response to a third agent's discovery request associated with an executable file, wherein (i) the discovery request was transmitted from the third agent to the second agent, and (ii) the response to the discovery request is transmitted from the second agent to both the first agent and the third agent, wherein the third agent's discovery request comprises: an agent identifier, a file name associated with the executable file, a file path, a file size, a file date, and a priority value;

storing, in response to said receiving, an indication of at least one of the second or third agents in a cache of the first agent even when the first agent does not currently require the executable file, wherein the indication specifies where the executable file in the response is located;

removing the indication of at least one of the second or third agents from the cache at a pre-determined time;

if a new response has a higher priority than the response associated with the stored indication, the stored indication is replaced with an indication associated with the new response; and if selecting an agent to retrieve the executable file, selecting the agent based on the priority value, wherein the agent that reports a highest priority value is selected.

2. The method of claim 1, wherein the first agent comprises at least one of: (i) a network device, (ii) a personal computer, or (iii) a server.

3. The method of claim 1, wherein said receiving is associated with at least one of: (i) a communication network, (ii) a peer-to-peer network, or (iii) a packet network.

4. The method of claim 1, wherein the received response comprises a multicast or broadcast response.

5. The method of claim 1, wherein the third agent's discovery request further includes at least one of: a cyclic redundancy checking value, a hash value, or a remote location identifier.

6. The method of claim 1, wherein the third agent's discovery request indicates that the third agent is attempting to receive the executable file.

7. The method of claim 6, wherein the received response indicates that the second agent is able to provide at least a portion of the executable file.

8. The method of claim 1, wherein the third agent's discovery request indicates that the third agent is attempting to provide the executable file.

9. The method of claim 8, wherein the received response indicates that the second agent wants to receive at least a portion of the executable file.

10. The method of claim 1, wherein said storing comprises storing information associated with a plurality of responses in the cache.

11. The method of claim 1, wherein said storing comprises storing information associated with a plurality of executable files in the cache.

12. The method of claim 1, further comprising:
determining at the first agent that the executable file will be accessed;
retrieving the stored indication from the cache; and
accessing the executable file in accordance with the stored indication.

13. The method of claim 12, wherein said accessing is associated with at least one of: (i) the second agent or (ii) the third agent.

14. A device, comprising:
a processor; and
a storage device adapted to communicate with said processor and storing instructions adapted to be executed by said processor to:
receive, at a first agent, a second agent's response to a third agent's discovery request associated with an executable file, wherein (i) the discovery request was transmitted from the third agent to the second agent, and (ii) the response to the discovery request is transmitted from the second agent to both the first agent and the third agent, wherein the third agent's discovery request comprises: an agent identifier, a file name associated with the executable file, a file path, a file size, a file date, and a priority value;

store, in response to said receiving, an indication of at least one of the second or third agents in a cache of the first agent even when the first agent does not currently require the executable file, wherein the indication specifies where the executable file in the response is located;

remove the indication of at least one of the second or third agents from the cache at a pre-determined time;

if a new response has a higher priority than the response associated with the stored indication, the stored indication is replaced with an indication associated with the new response; and if selecting an agent to retrieve the executable file, selecting the agent based on the priority value, wherein the agent that reports a highest priority value is selected.

15. The device of claim 14, wherein said storage device further stores a local response cache.

16. A medium storing instructions adapted to be executed by a processor to perform a method of facilitating access to resources, said method comprising:
receiving, at a first agent, a second agent's response to a third agent's discovery request associated with an executable file, wherein (i) the discovery request was transmitted from the third agent to the second agent, and (ii) the response to the discovery request is transmitted from the second agent to both the first agent and the third agent, wherein the third agent's discovery request comprises: an agent identifier, a file name associated with the executable file, a file path, a file size, a file date, and a priority value;

storing, in response to said receiving, an indication of at least one of the second or third agents in a cache of the first agent even when the first agent does not currently require the executable file, wherein the indication specifies where the executable file in the response is located;

removing the indication of at least one of the second or third agents from the cache at a pre-determined time;

if a new response has a higher priority than the response associated with the stored indication, the stored indication is replaced with an indication associated with the new response; and if selecting an agent to retrieve the executable file, selecting the agent based on the priority value, wherein the agent that reports a highest priority value is selected.

17. The medium of claim 16, wherein said method further comprises:
determining at the first agent that the executable file will be accessed;
retrieving information from the cache; and
accessing the resource in accordance with the retrieved information.

18. A computer-implemented method of facilitating access to files through a peer-to-peer network, comprising:
receiving, at a first device, a second device's multicast response to a third device's discovery request associated with an executable file, the response including a device identifier, a file identifier, and a priority value, wherein (i) the discovery request was transmitted from the third device to the second device, and (ii) the multicast response to the discovery request was transmitted from the second device to both the first device and the third device, wherein the third agent's discovery request comprises: an agent identifier, a file name associated with the executable file, a file path, a file size, a file date, and a priority value that indicates an ability to exchange information;

storing, in response to said receiving, an indication of at least one of the second or third devices in a local response cache, the local response cache including information associated with a plurality of responses and a plurality of executable files, wherein the indication specifies where the executable file in the response is located;

after said storing, determining at the first device that the executable file will be accessed;

retrieving the indication from the local response cache;

accessing the executable file via at least one of the second device and the third device based on the priority value associated with the second device and a priority value associated with the third device;

removing the indication of at least one of the second or the third devices from the cache at a pre-determined time;

if a new response has a higher priority than the response associated with the stored indication, the stored indication is replaced with an indication associated with the new response;

if selecting an agent to retrieve the executable file, selecting the agent based on the priority value, wherein the agent that reports a highest priority value is selected.

19. The method of claim 18, wherein the first device comprises a personal computer associated with the peer-to-peer network.

20. The method of claim 1, wherein each agent monitors a priority value included in another agent's response to the discovery request.

21. The method of claim 1, wherein the priority value is based on a maximum speed at which an agent can transmit.

* * * * *